United States Patent [19]

Hikima et al.

[11] Patent Number: 4,820,899
[45] Date of Patent: Apr. 11, 1989

[54] LASER BEAM WORKING SYSTEM

[75] Inventors: Ikuo Hikima, Kawasaki; Akira Miyaji, Tokyo; Saburo Kamiya; Akikazu Tanimoto, both of Yokohama, all of Japan

[73] Assignee: Nikon Corporation, Tokyo, Japan

[21] Appl. No.: 161,944

[22] Filed: Feb. 29, 1988

[30] Foreign Application Priority Data

Mar. 3, 1987 [JP] Japan ................................ 62-46782
Jul. 20, 1987 [JP] Japan ............................... 62-180479

[51] Int. Cl.⁴ ............................................ B23K 26/00
[52] U.S. Cl. .......................... 219/121.76; 219/121.74; 219/121.78
[58] Field of Search ...................... 219/121.76, 121.77, 219/121.74, 121.75, 121.78, 121.79, 121.61, 121.62, 121.63, 121.44; 355/53; 346/76 L

[56] References Cited

U.S. PATENT DOCUMENTS

| | | | |
|---|---|---|---|
| 4,408,602 | 10/1983 | Nakajima | 219/121.76 X |
| 4,613,206 | 9/1986 | Franchetti et al. | 350/174 |
| 4,653,903 | 3/1987 | Torigoe et al. | 355/53 |
| 4,655,590 | 4/1987 | Aaqano et al. | 219/121.76 X |
| 4,690,528 | 9/1987 | Tanimoto et al. | 353/101 |
| 4,701,591 | 10/1987 | Masaki et al. | 219/121.79 X |
| 4,728,773 | 3/1988 | Roberts et al. | 219/121.78 X |

*Primary Examiner*—C. L. Albritton
*Attorney, Agent, or Firm*—Shapiro and Shapiro

[57] ABSTRACT

A laser working system comprises supplying means for supplying a laser beam, a working unit which includes a stage for supporting a workpiece and means for exposing the workpiece to the laser beam, and a room unit which includes wall means for surrounding the working unit and accomodates the working unit to spatially isolate it from outside of the wall means. The supplying means is arranged outside the room unit and includes first and second laser units each for generating the laser beam.

The laser working system further comprises beam guiding means which creates first light path for optically communicating the first laser unit with the working unit through the wall means, and second light path for optically communicating the second laser unit with the working unit through the wall means, respectively.

9 Claims, 4 Drawing Sheets

LASER BEAM WORKING SYSTEM

BACKGROUND OF THE INVENTION

1. Field of the Invention

The present invention relates to a working apparatus, and, in particular, it relates to a system for supplying an illuminating laser beam to an exposing apparatus for manufacturing semi-conductor integrated circuits.

2. Related Background Art

In general, exposing apparatuses for manufacturing semi-conductor IC or LSI have been proposed in such a manner that each of the exposing apparatuses included a light source for providing exposure energy. Further, in order to reduce weight of the system, it has been proposed that a single source of laser beam was used in common with respect to a plurality of exposing apparatuses so as to selectively supply exposure energy to a desired exposing apparatus from the single laser beam source, as described in U.S. Pat. No. 4,653,903.

Nowadays, ultraviolet rays such as g-ray (having a wavelength of 436 nm) or i-ray (having a wavelength of 365 nm) emitted from a mercury lamp have generally been used as a light source for exposure energy. Recently, pulse generating laser, and particularly excimer laser having a strong spectrum in the ultraviolet band or zone and having strong output intensity has been remarked.

In the excimer laser apparatus, laser is generated by applying discharge energy to a laser medium comprising the mixture of halogen and rare gas. Therefore, the use of the excimer laser apparatus requires installations for supplying a gas such as halogen at high pressure and for generating a high voltage required for a discharge phenomenon.

Accordingly, the excimer laser apparatus will be of a large size as a whole since it includes such installations as well as a plurality of pipes for the used gases. Further, in the excimer laser apparatus, since the poisonous or toxic gases are used, security regarding such toxic gases must be considered and maintained. Furthermore, in the excimer laser apparatus, noise due to the discharge is apt to exert a bad influence upon peripheral equipments, and there arises dust during operation and/or maintenance of the laser apparatus.

On the other hand, since a clean room in which the exposure operation is performed is very expensive in the cost of its construction, as interior space thereof must be utilized effectively. Further, since the clean room is a closed room, security thereof must be maintained; and, since in the clean room many precision machines sensitive to the noise are normally settled and are in operation, a measure to counter the noise must be considered. In addition, since the clean room is naturally prejudiced against the dust, apparatuses or machines which generate the dust should not be installed in the clean room to the utmost.

For these reasons, when the excimer laser apparatus is installed in the clean room, there arise many problems such that a large space is occupied by the laser apparatus; that another danger due to the laser apparatus will occur; that the noise and/or dust are generated by the laser apparatus; and that the maintenance of the laser apparatus will be difficult, and the like.

Further, when the pulse generating laser created on the basis of the gaseous laser medium is used, since the number of luminous pulses is limited due to deterioration of the laser medium, the laser medium must be replaced periodically. Further, since window plates provided on a laser discharging chamber are soiled or stained by a halide and the like, these window plates must be replaced periodically.

In the prior art mentioned above, there was a problem that when the operation of the laser source is stopped due to trouble or maintenance the whole exposing apparatus is also stopped.

SUMMARY OF THE INVENTION

An object of the present invention is to provide a laser system capable of supplying energy beams stably to a working apparatus without reducing the working ability of the apparatus.

Another object of the present invention is to provide a laser system which can be installed, without generation of undesirable noise and/or dust, in a clean room into which a working apparatus is arranged.

A further object of the present invention is to provide a laser system wherein the supply of the energy beam to the working apparatus is not interrupted even during the maintenance operation of the laser system.

In the present invention, an exposing apparatus for manufacturing semi-conductor integrated circuits, an optical CVD, a laser drawing or picturing apparatus, an etching apparatus and the like can be applied as a working apparatus.

DESCRIPTION OF THE PREFERRED EMBODIMENTS

Figure 1:
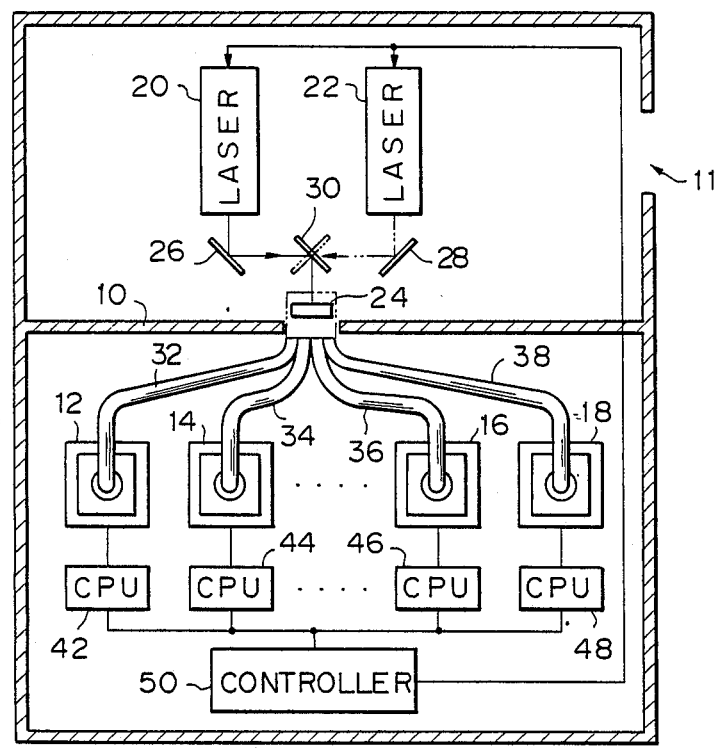
FIG. 1 is a plan view showing an arrangement of an exposing system according to a first embodiment of the invention.

FIG. 1 shows a first embodiment of an exposing system. The exposing system comprises a plurality of exposing units 12, 14, 16 and 18; two laser units 20 and 22; an optical device for directing exposure energy supplied from the laser units to each of the exposing units; and a control device for controlling the operation of each exposing unit and of each laser unit.

Figure 2:
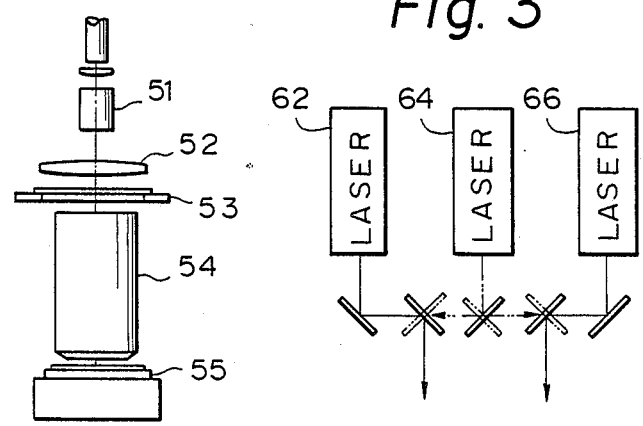
FIG. 2 is a schematic side view of an exposing unit.

As the exposing units 12–18, either projection-exposing units wherein the projected image of a mask is formed on a wafer, or proximity-exposing or contact-exposing units wherein the mask is arranged in proximity of or in contact with the wafer may be adopted. When the projection-exposing units are used as the exposing units, each exposing unit, as shown in FIG. 2, is provided with a illuminating optical system including an optical indicator 51 and a collimator 52, a reticle stage 53, a projecting optical system 54, and a wafer stage 55.

In exposing units 12–18 are accommodated into a clean chamber or clean room. Each of optical fibers 32, 34, 36 and 38 is connected, at its one end, to a top of the corresponding exposing unit to introduce or supply a laser beam from the laser units to the corresponding exposing unit through an outer wall 10 of the clean room. The other ends of the optical fibers are arranged in front of an opening formed in the outer wall 10 and are optically connected to a cylindrical lens 24 situated in said opening.

The laser units 20 and 22 are positioned outside the clean room. Fixed reflection mirrors 26, 28 and a movable reflection mirror 30 rotatable through an angle of 90° are arranged in association with outputs of the laser units in such a manner that a laser beam emitted from the laser unit 20 or 22 is reflected by the fixed mirror 26 or 28 to reach the movable mirror 30. For example, when the laser beam from the laser unit 20 is sent to the cylindrical lens 24, the movable mirror 30 is shifted to a position shown by a solid line in FIG. 1; on the other hand, when the laser beam emitted from the laser unit 22 is sent to the cylindrical lens 24, the movable mirror 30 is shifted to a position shown by a phantom line in FIG. 1. Thus, the two laser units can be selectively used.

CPU 42, 44, 46 and 48 are connected to the exposing units 12, 14, 16 and 18, respectively, to control alignment between the reticle and the wafer and stepping operation of the wafer stage 55. A controller 50 controls all of the exposing units 12–18 through these CPU 42–48 and sends a trigger signal for generating the laser beam when receives a exposure demand signal from the CPU.

A room in which the laser units are installed is provided with an entrance 11 through which an operator can enter into said room for the maintenance of the laser units. Further, in order to maintain the clean room in an air-tight condition, it is preferable to provide an air-tight partition wall between the clean room and the room where the laser units are installed.

When the controller 50 receives the exposure demand signal or signals from one or more of the CPU 42–48, the controller energizes one of the laser units (for example, laser unit 20) to cause the laser unit 20 to generate the laser beam. The laser beam emitted from the laser unit 20 is reflected by the fixed mirror 26 and the movable mirror 30 (solid line position) to reach the cylindrical lens 24, by which the laser beam is changed to a spot extending in one direction in a focal plane. The other ends of the optical fibers 32–38 are arranged linearly along a longitudinal direction of the spot of the laser beam so that the laser beam can be introduced into the clean room and supplied to each of the exposing units through these optical fibers.

With the above-mentioned construction, the laser beam emitted from the laser units situated outside the clean room can be supplied to the exposing units situated inside the clean room, thereby performing the exposing operation in each of the exposing units.

When the laser unit 20 is required to deenergize or stop to replace the laser medium and the like, the other laser unit 22 (stopped up to now) is energized to generate the laser beam and at the same time the movable mirror 30 is rotated by an angle of 90° to occupy the phantom position.

Figure 3:
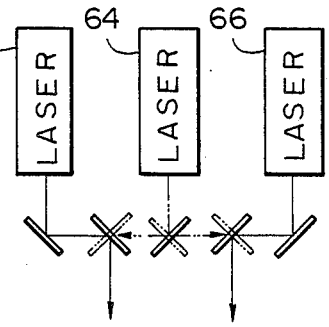
FIG. 3 is a schematic plan view of an alternation of the laser system.

The number of the laser sources which can be selectively used may be increased, for example, as shown in FIG. 3, by providing three laser units 62, 64 and 66 and by providing three movable reflection mirrors 8 for selectively reflecting the laser beam emitted from one of the laser units.

In general, in the mirror system as mentioned above, for example, when a plurality of the laser units (N in number) are used, the number of the required movable mirrors is determined by the sum of the number of the laser units other than the units situated on both ends, i.e., (N-2) and the number of the spaces between the adjacent two units, i.e., (N-1); thus, when the N laser units are used, (2N-3) movable mirrors may be provided.

Consequently, the number of the laser sources which can be simultaneously used will be (N-1). If n (in number) exposing units are provided with respect to each laser source, it is possible to supply the laser beam to n(N-1) exposing units in total.

With such construction, since one of the laser units can always be stopped even when the laser beam is continuously supplied to n(N-1) exposing units, the laser system can be continuously operated without interruption of the exposing operation even when any one of the laser units is stopped due to the trouble thereof or the replacement of the laser medium, window plates, electrodes and the like.

Next, a second embodiment of the present invention will be explained with reference to FIG. 4.

Figure 4:
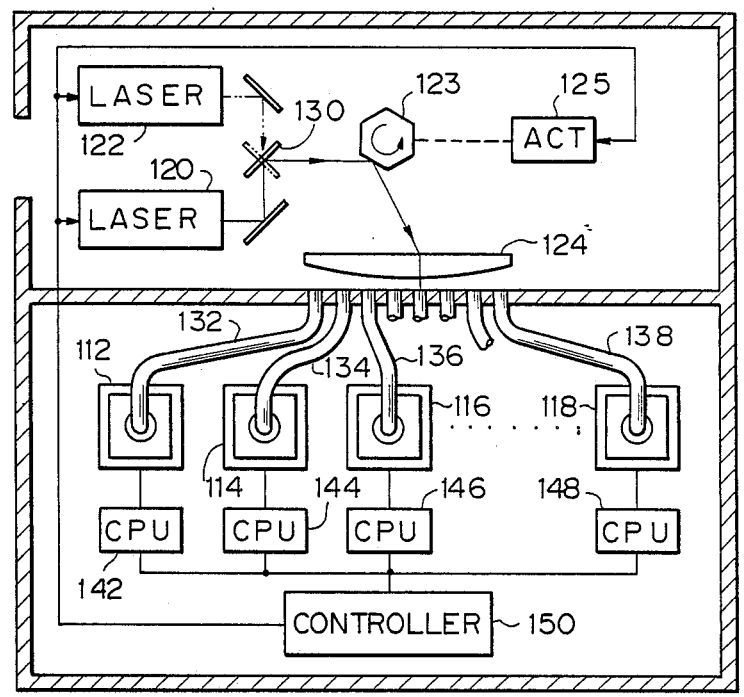
FIG. 4 is a plan view showing an arrangement of an exposing system according to a second embodiment of the invention.

In FIG. 4, a laser beam emitted from one of laser units 120, 122 is reflected by a movable reflection mirror 130 to reach a polygonal mirror 123. The polygonal mirror reflects the laser beam from the movable mirror 130 onto a tele-centric lens or f-$\theta$ lens 124.

An actuator 125 adjusts an angle of rotation of the polygonal mirror 123 so that the laser beam reflected by the polygonal mirror is introduced to any one of ends of optical fibers 132–138 arranged linearly, thereby sending the laser beam to a corresponding one of exposing units 112–118 situated in the clean room.

In response to exposure demand signals emitted from CPU 142–148 connected to the corresponding exposing units 112–118, a controller 150 controls the laser units 120, 122 and the actuator 125 in such a manner that the deflection of the laser beam by means of the polygonal mirror 123 is effected in synchronism with the generation of the pulse of the laser beam by means of the laser unit 120 or 122 to positively send the laser pulse to one of the optical fiber ends. In general, since the excimer laser source can be triggered from outside, it is possible to synchronize the deflection of the laser beam with the generation thereof by triggering or energizing the excimer laser source just when a desired angular position of the polygonal mirror is detected.

Although the polygonal mirror is used in the illustrated embodiment, it should be noted that a galvano mirror, a vibration mirror or the like can be used in place of the polygonal mirror.

In third and fourth embodiments illustrated and explained below, in place of the optical fibers, a mirror system is used for supplying the laser beam to the exposing units in the clean room. Further, in this case, the number of the laser sources arranged is greater than that of the exposing units.

Figure 5:
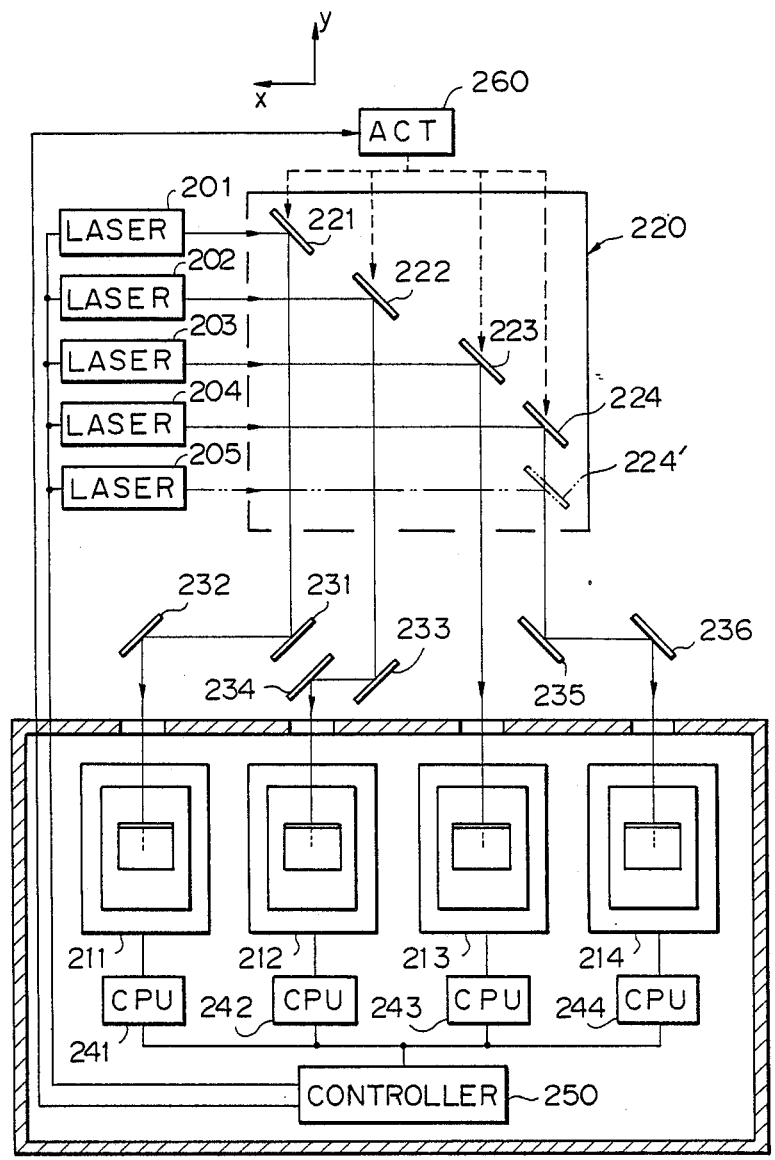
FIG. 5 is a plan view showing an arrangement of an exposing system according to a third embodiment of the invention.

In the third embodiment shown in FIG. 5, a group (for example, 5 in number) of laser units 201, 202, 203, 204 and 205 are provided. Each of laser beams emitted from these laser units is supplied to one of a group (for example, 4 in number) of exposing units 211, 212, 213 and 214 through a distributor 220 and a plurality of fixed mirrors 231–236. The distributor 220 includes a group (for example, 4 in number) of movable mirrors 221-224 as shown by solid line in FIG. 5. Normally, four laser units 201-204 are actuated and the other laser unit 205 is in an inoperative condition. The laser beams emitted from the laser units 201-204 are reflected by the movable mirrors 221-224, respectively, and then are supplied to the exposing units 211-214, respectively. The movable mirrors 221-224 can be shifted independently in a y-direction by means of an actuator 260.

Assuming that one of the laser units, for example the laser unit 204 is deenergized or stopped due to the trouble or maintenance thereof. In this case, the movable mirror 224 of the distributor 220 is shifted to a phantom position 224' and at the same time the remaining laser unit 205 is energized. In this way, the exposing unit 214 can receive the laser beam from the laser unit 205 (in place of the stopped laser unit 204). In this case, since the switching-over operation can be effected quickly only by shifting the movable mirror, the downtime when the whole exposing units are in inoperative condition can be minimized. Similarly, each of the movable mirrors 221, 222, 223 can also be associated with any one of the laser units by shifting the movable mirror in the y-direction as shown in FIG. 5. Accordingly, in this embodiment, one of the laser units can always be in inoperative condition.

The exposing units are installed in the clean room, as in the case of the first and second embodiments, to spatially isolate them from the laser units.

Further, CPU 241-244 and a controller 250 are provided for generating each laser beam in response to or in synchronism with the exposure demand signal from the corresponding exposing unit. The controller 250 controls the actuator 260 so as to correspond the four actuated laser units to any one of the four exposing units (by shifting the movable mirrors 221-224).

In the illustrated embodiment, since each of the four movable mirrors can associate with any one of the five laser units 201-205, the plurality of the exposing units can be continuously operated substantially without downtime thereof regardless of the condition of the laser units.

As an alternation of the third embodiment, all of the mirrors 221-224 may be fixed. However, in this case, a shiftable mirror (not shown) which can be shifted in an x-direction along an optical axis of the laser unit 205 should be provided. When each of the laser units 201-204 is in operative condition, the shiftable mirror is retracted in its inoperative position where the shiftable mirror does not interrupt any light paths of the laser beams from the laser units to the exposing units. However, for example, if the laser unit 201 is stopped, the shiftable mirror is shifted to a position where the light path between the mirrors 221, 231 crosses with the optical axis of the laser unit 205, thereby supplying the laser beam from the laser unit 205 to the exposing unit 211 through the fixed mirrors 231 and 232.

Figure 6:
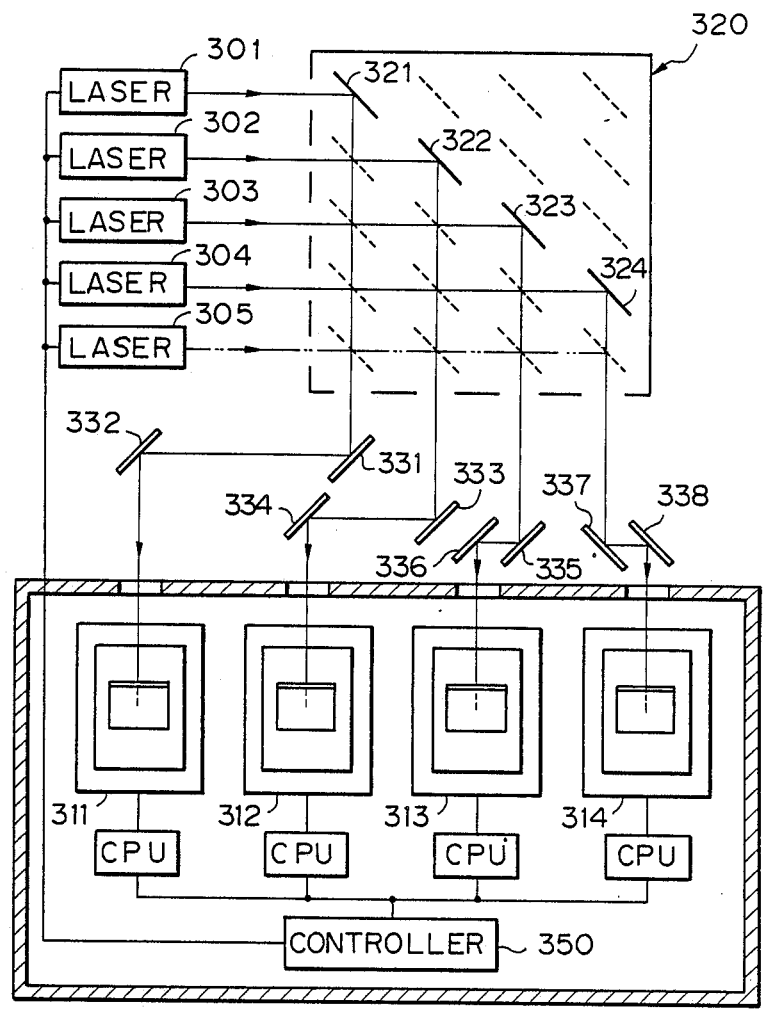
FIG. 6 is a plan view showing an arrangement of an exposing system according to a fourth embodiment of the invention.

Next, in the fourth embodiment shown in FIG. 6, a group (for example, 5 in number) of laser units 301-305 are provided. Each of luminous laser beams emitted from these laser units is supplied to one of exposing units 311-314 in a clean room through a distributor 320 and a plurality of fixed mirrors 331-338.

The distributor 320 is constituted by twenty mirrors arranged in a 4 × 5 matrix pattern, each of these mirrors being switched over between an operative (reflection) position and a retracted position under the control of a controller 350. In the illustrated example, the mirrors 321-322 positioned in their operative positions are shown by solid line, whereas the mirror positioned in their retracted positions are shown by dotted line. In the retracted position, the mirrors do not interrupt any light paths of the laser beams from the laser units to the exposing units. As can be understood from FIG. 6 also in this fourth embodiment, similar to the third embodiment, by suitably selecting the conditions of the mirrors, the four exposing units can substantially continuously be operated even when one of the laser units is in the inoperative condition. It should be noted that each of the twenty mirrors can be shifted in a direction perpendicular to a plane of FIG. 6 to select the operative position or the retracted position by means of an appropriate actuator (not shown).

It should be noted that, although four exposing units are provided with respect to five laser units in the third and fourth embodiments, it is not limited to these numbers if the number of the laser units is greater than that of the exposing units.

Further, in each of the third and fourth embodiments illustrated, each of the laser units can be associated with any one of the exposing units by changing-over the condition of the mirrors by means of the distributor 220 or 320. In this case, the controller 250 or 350 simultaneously changes over the condition of interfaces for various signals connecting between the exposing units and the laser units, whereby a selected laser unit can receive the exposure demand signal from a specific exposing unit.

Furthermore, when the reserve laser unit is used, before the reserve laser unit is associated with a desired exposing unit, a laser beam (alignment beam) having a wavelength different from that of the exposing laser beam may be sent in coaxial with the light path of the exposing laser beam, thereby previously effecting the alignment between the optical axis of the laser unit and that of the exposing unit. With such arrangement, the exposing operation can be effected immediately after the mirrors are changed over to their selected positions without any alignment between the laser units and the exposing units.

Even when the excimer laser having a narrower band which will cause deviation of wavelength of the output laser beam is used, if the wavelength of the laser beam emitted from the laser unit is checked and corrected by means of an appropriate spectrometer such as grating spectrometer before said laser unit is communicated with the corresponding exposing unit, it is possible to effect the exposing operation immediately after the laser unit is communicated with the corresponding exposing unit. Further, two or more reserve laser units may be provided in accordance with the number of the exposing units used; in this case, the exposing units can continuously operate even when two or more laser units are stopped.

We claim:

1. A laser working system, comprising:
   supplying means for supplying a laser beam;
   a working unit including a stage for supporting a workpiece and means for exposing said workpiece to the laser beam;
   a room unit, including wall means for surrounding said working unit, for accommodating said working unit to spatially isolate it from outside of said wall means, said supplying means being arranged outside said room unit and including first and second laser units each for generating said laser beam; and beam guiding means for creating a first light path for optically communicating said first laser unit with said working unit through said wall means, and a second light path for optically communicating said second laser unit with said working unit through said wall means, respectively.

2. A laser working system as set forth in claim 1, wherein said beam guiding means includes changing-over means for creating said first light path and said second light path alternately, and wherein the laser working system further comprises means for enabling one of said first and second laser units which is optically communicated with said working unit.

3. A laser working system as set forth in claim 2, wherein said working unit has an optical axis, said changing-over means having a first position where an optical axis of the laser beam from said first laser unit is optically aligned with said optical axis of said working unit, and a second position where an optical axis of the laser beam from said second laser unit is optically aligned with said optical axis of said working unit.

4. A laser working system, comprising:
supplying means for supplying a laser beam;
a first working unit including a stage for supporting a workpiece and means for exposing said workpiece to said laser beam;
a second working unit including a stage for supporting a workpiece and means for exposing said workpiece to said laser beam;
a room unit, including wall means for surrounding said first and second working units, for accommodating said first and second working units to spatially isolate them from outside of said wall means, said supplying means being arranged outside said room unit and including first and second laser units each for generating said laser beam; and
beam guiding means, having a first communicating condition in which said first laser unit is optically communicated with each of said first and second working units through said wall means and a second communicating condition in which said second laser unit is optically communicated with each of said first and second working units through said wall means, for directing said laser beam to each of said first and second working units.

5. A laser working system as set forth in claim 4, wherein said beam guiding means includes changing-over means for creating said first communicating condition and said second communicating condition alternately, and wherein the laser working system further comprises means for enabling one of said first and second laser units which is communicated with each of said first and second working units.

6. A laser working system, comprising:
supplying means for supplying laser beams, said supplying means including first and second laser units each for generating the laser beam;
a first working unit including a stage for supporting a workpiece and means for exposing said workpiece to said laser beam;
a second working unit including a stage for supporting a workpiece and means for exposing said workpiece to said laser beam;
control means for commanding generation of the laser beam with respect to a selected one of said first and second laser units;
first beam guiding means provided for directing the laser beam from said first laser unit to both of said first and second working units concurrently when said first laser unit is operated; and
second beam guiding means provided for directing the laser beam from said second laser unit to both of said first and second working units concurrently when said second laser unit is operated.

7. A laser working system, comprising:
a plurality of working units each including a stage for supporting a workpiece and means for exposing said workpiece to a laser beam;
a plurality of laser units each provided for supplying said laser beam, the number of said laser units being larger than that of said working units; and
beam distributing means provided for directing the laser beams emitted from the numbers of the laser units as those of the working units to the plurality of the working units, respectively, and for directing the laser beam emitted from at least one of the remaining laser units to any of at least one of the working units.

8. A laser working system as set forth in claim 7, wherein said beam distributing means includes movable mirror means for changing over a light path of the laser beam from said at least one of the laser units.

9. A laser working system as set forth in claim 7, wherein said beam distributing means includes movable mirror means for changing over light paths from said plurality of laser units, respectively.

* * * * *